United States Patent [19]

Yoshimura et al.

[11] 3,984,885

[45] Oct. 12, 1976

[54] 4-CHANNEL HEADPHONES

[75] Inventors: Hisashi Yoshimura, Minoo; Yasutake Nishimura, Hirakata, both of Japan

[73] Assignee: Matsushita Electric Industrial Co., Ltd., Osaka, Japan

[22] Filed: Mar. 4, 1975

[21] Appl. No.: 555,093

[30] Foreign Application Priority Data

Mar. 15, 1974 Japan ................................ 49-30357
Mar. 20, 1974 Japan ................................ 49-32032

[52] U.S. Cl. .......................... 179/156 R; 179/1 GQ

[51] Int. Cl.[2] ...................... H04M 1/05; H04R 5/02

[58] Field of Search ............ 179/1 G, 1 GQ, 156 R, 179/182 R

[56] References Cited

UNITED STATES PATENTS 3,609,240 9/1971 Fixler .................................. 179/1 G
3,794,779 2/1974 Greuzerd ........................ 179/156 R
3,796,840 3/1974 Ohta .............................. 179/156 R

*Primary Examiner*—William C. Cooper
*Attorney, Agent, or Firm*—Stevens, Davis, Miller & Mosher

[57] ABSTRACT

A structure of four-channel headphones having sound insulating means between front and rear channel driver units, and tone control means only for the front channel tones, said sound insulating means being formed of foam material which transmits low-pitched tones and absorbs high-pitched tones. Separation of the front and the rear channel tones is improved to closely resemble four-channel sound reproduction in a free field and the output levels of the medium-high range tones of the two front channels are made variable.

5 Claims, 7 Drawing Figures

4-CHANNEL HEADPHONES

This invention relates to four-channel headphones, and more particularly to an improved four-channel headphone structure.

Four-channel sound recording and reproducing systems have been the subject of much development. For example, matrix four-channel and discrete four-channel systems, together with various four-channel audio instruments have been proposed. In all of these systems, four-channel headphones are an indispensable instrument for quietly listening to the four-channel reproduced sounds by oneself.

An object of this invention is to make available four-channel headphones which provide excellent sound separation between the front and rear channels and reproduce four-channel sounds which closely resemble those in a free field.

Another object of this invention is to provide four-channel headphones for a multiway system which have very practical and useful tone control means.

A further object of this invention is to provide four-channel headphones of low cost, light weight, and large utility which are provided with volume control means, tone control means, and 2 – 4 channel selecting switch-over means.

Yet another object of this invention is to provide four-channel headphones having cushion means which transmit low-pitched tones and absorp high-pitched tones. The cushion means is attached to a baffle board at a boundary between the front and rear channel driver units. Tone control means are provided only for front channel sounds.

In the headphones of this invention, tone control means are provided only for the front channel sounds so that the weight of the headphones is kept low and a difference in tone quality can be obtained between the front and rear channels. Since cushion means which transmit low-pitched tones and absorp high-pitched tones are provided at a boundary between the front and the rear channel driver units, the sound separation and distinction between the front and rear channels is clear. Further, the cushion means absorbs the tones of peaking frequencies in the medium and high frequency range and helps in the reproduction of smooth sounds which are easy to listen to. Thus, true four-channel panoramic sound reproduction is made possible. Further, the total structure can be made compact. Thus, this inventon has much production merit.

Other objects, features and advantages of this invention will become apparent in the following detailed description of preferred embodiments made in connection with the accompanying drawings, in which.

Hereinbelow, preferred embodiments will be described in connection with the drawings.

Figure 1:
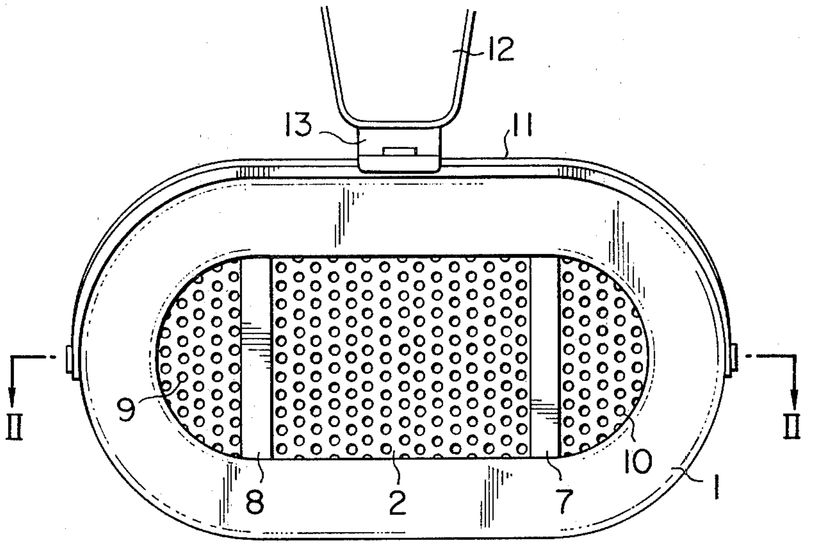
FIG. 1 is a front view of an embodiment of one four-channel headphones subsystem according to this invention.
Figure 2:
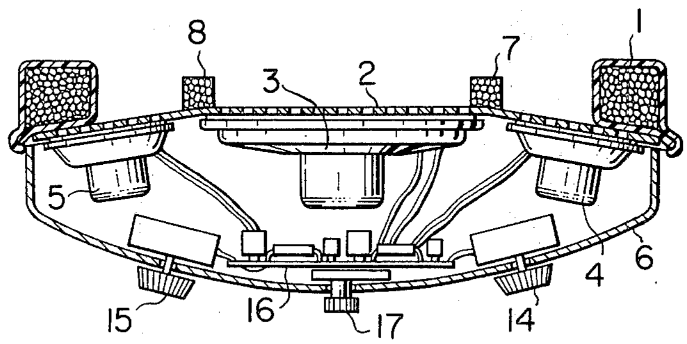
FIG. 2 is a cross-section of the headphone subsystem of FIG. 1 along the line II — II.
Figure 3:
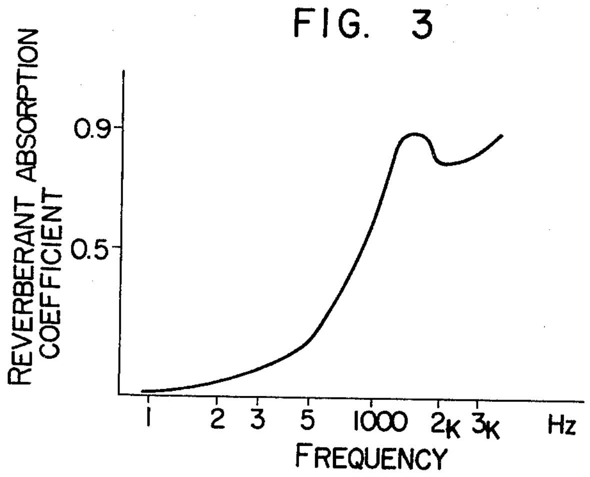
FIG. 3 is a graph of the reverberant absorption coefficient of a sound insulating wall as a function of frequency used in the four-channel headphones according to this invention.

FIGS. 1 and 2 show an embodiment of a four-channel headphone subsystem in which an ear cushion 1 comprises a soft and elastic inside plastic member made, for example, of urethane foam and an outer member good to the touch made, for example, of foam polyvinyl chloride leather. The outer member wraps the inside member to shut off external sounds and provide a comfortable cushion. A baffle board 2 forms the front of an enclosure defined at the rear by a casing 6. The board 2 is formed of metal or plastic and includes a number of small apertures to allow free transmission of sounds. A woofer 3 is mounted on the back surface of baffle 2 at a central portion. On both sides of the woofer 3, medium-high range driver units 4 and 5 are mounted. The ear cushion 1 is mounted on the periphery of baffle 2. On the front surface of baffle 2, at the boundaries between the sound radiating apertures for the woofer 3 and medium-high range driver units 4 and 5, are provided sound insulating walls 7 and 8 formed of foaming material such as urethane foam, including continuous foams. Walls 7 and 8 transmit low-pitched tones and absorb high-pitched tones. These sound insulating walls 7 and 8 separate the space defined by the ear cushion into three parts, the height of the walls being designed to be lower than that of the ear cushion. As an example of the material for these sound insulating walls 7 and 8, urethane foam continuous foam rubber of a thickness of 10 mm was used. The reverberant absorption coefficient of this material is shown in FIG. 3. The tone absorption characteristic varies according to foaming ratio, thickness and density of the material. It should be noted here that for improving separation of the front and rear sounds, the front and rear driver units should be separated as far as possible and that in a free field a man can sense the front-rear direction of a sound source only for relatively high-pitched tones above 5 or 6 kHz. The present embodiment utilizes these facts and adopts two-way compositions of a three dimensional system (3D system) contained in one unit housing for front and rear channels. Namely, a woofer 3 is located at the center, medium-high range driver units 4 and 5 are located before and behind the woofer 3, and sound insulating walls 7 and 8 which transmit low-pitched tones and absorb high-pitched tones are provided between the woofer 3 and the medium-high range driver units 4 and 5 so as to prevent the mixing of front and rear medium-high range tones until they reach the auditory canal of a listener's ear. Sounds produced by the front or rear medium-high range driver units 4 or 5 are radiated from small apertures in baffle 2, transmit through the space defined by the ear cushion 1 and the sound insulating wall 7 or 8, get over the sound insulating wall 7 or 8 and reach a listener's ear. In other words, high-pitched tones from the front and the rear channels are separated until they reach a listener's ear.

In FIG. 2, the subsystem is also provided with a control means 14 which operates as a volume balancing control during four-channel reproduction and as a volume control during two-channel reproduction, a tone control 15 for varying the output level of the front channel high range, a dividing network 16, and a 2 – 4 channel selecting change-over switch 17.

Figure 4:
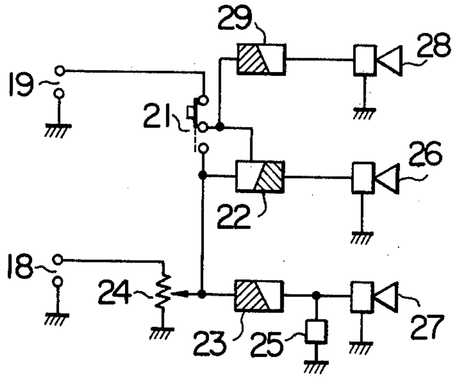
FIG. 4 is a basic circuit diagram for the four-channel headphones according to this invention.

FIG. 4 shows a circuit structure for the case of the three dimensional system (3D system). The figure shows only the circuit for the left channel, and the circuit for the right channel may have a completely similar structure. A front channel signal source 18 is connected to a medium-high range loudspeaker 27 through balancing volume control 24, high-pass filter 23 and tone control means 25 and to a woofer 26 through the balancing volume control 24 and a low-pass filter 22. A rear channel signal source 19 is connected to the woofer 26 through the low-pass filter 22 and to another medium-high range driver unit 28 through another high-pass filter 29. Numeral 21 represents a 2 – 4 channel change-over switch. When the switch 21 is thrown to the four-channel side, the rear signal source 19 is connected to the driver unit system independently of the front signal source 18. When the switch is thrown to the two-channel side, the rear signal source 19 is cut off from the driver unit system and the rear medium-high range driver unit 28 is connected in parallel with the front medium-high range driver unit 27 and driven by the signal from the front signal source 18. The volume control 24 is used for adjusting the input level of the front channel signal and works as a balancing volume for adjusting the balance with the rear signal level or with the right channel signal when the switch 21 is thrown to the four-channel side. When the switch 21 is thrown to the two-channel side, it is connected before the total driver unit system and works as a volume control for adjusting the input level.

The reasons for using a one control circuit only for the front medium-high range driver unit are as follows. The rear signal includes much reverberation and is not so rich in high range components. Further, with respect to the auditory sense of a human being, the concha works as a reflector for sound waves of frequencies higher than 4 or 5 kHz coming from the backward position. Thus, high-pitched tones coming from the backward position do not enter the external auditory canal and hence are not sufficiently audible. Namely, it was found that it is unnecessary for the rear high range driver unit to produce high-pitched tones and that the provision of tone control means for the rear high range driver unit produces no effect. Since the high range performance of the rear high range speaker 28 is suppressed so as to be low compared to that of the front high range driver unit 27, adjustment of the high range performance of the front high range driver unit by the tone control means 25 also produces sufficient tone control effect in the case of two-channel reproduction.

Figure 5:
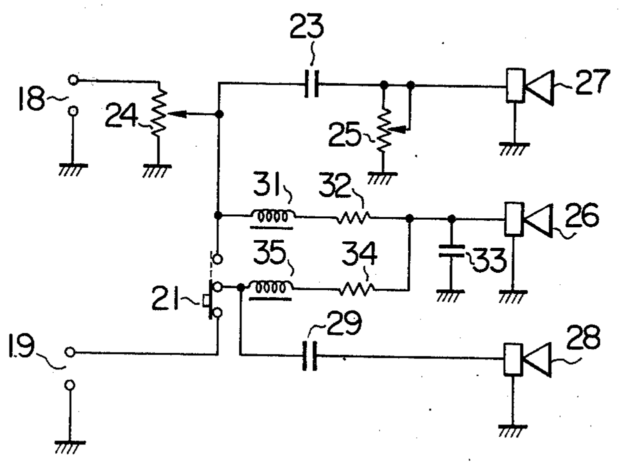
FIG. 5 is a circuit diagram of a concrete embodiment of the electric circuit for the four-channel headphones according to this invention.
Figure 6:
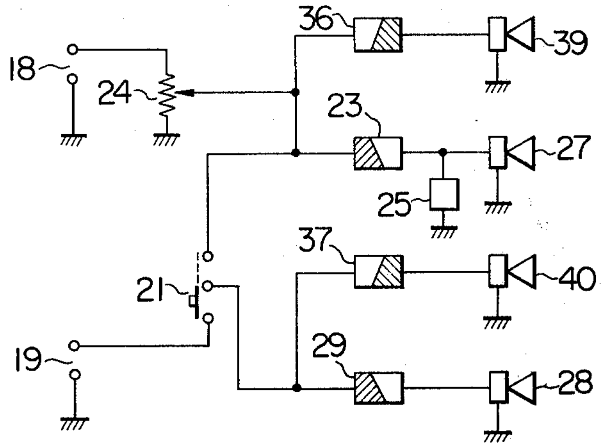
FIG. 6 is a circuit diagram of another concrete embodiment of the electric circuit for the four-channel headphones according to this inventon.

FIG. 5 shows a concrete embodiment of the circuit of FIG. 4. In the figures, similar numerals indicate similar parts. The low-pass filter 22 of FIG. 4 is formed of inductances 31 and 35, resistors 32 and 34 and a capacitor 33. The high-pass filters 23 and 29 are formed of capacitors. Although a 3D system using a common woofer for front and rear channel low-pitched tones has been described, front and rear woofers may be provided separately as in the embodiment shown in FIG. 6. In FIG. 6, the front and the rear channels have respective woofers 39 and 40 and respective medium-high range driver units 27 and 28. The circuit structure and function will be apparent in the figure. In this case, however, since four driver units are contained in one subsystem enclosure, the weight becomes considerable and is accompanied by some inconvenience in use.

Figure 7:
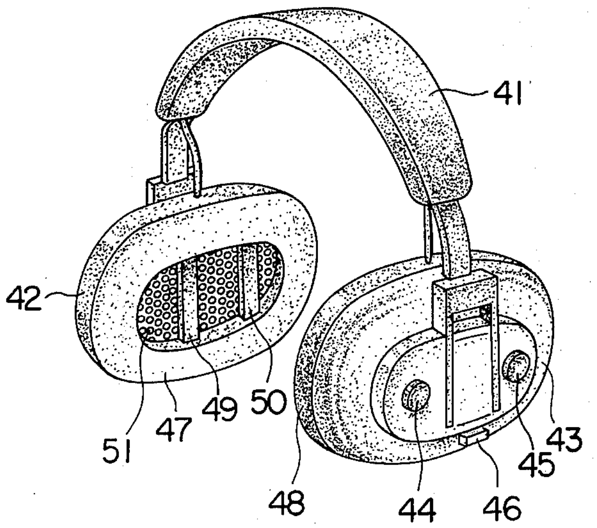
FIG. 7 is a perspective view of four-channel headphones according to this invention.

Practically, a total system may be formed as is shown in FIG. 7. Namely, at both ends of a head band 41 left and right housings 42 and 43 are attached. These housings 42 and 43 contain respectively three driver units. Knobs 44 and 45 are used to operate variable resistors for tone control of the front medium-high range driver unit and for adjusting the balance, and a 2 – 4 channel selection switch 46 are provided on the back (outer) surface of each of the housings 42 and 43. On the front (inner) side of each of the housings 42 and 43, an ear cushion 47 or 48 is attached. Sound insulating cushions 49 and 50 for improving separation of the front and the rear sounds are adhered to each baffle board 51.

What is claimed is:

1. Four-channel headphones comprising a head band and right and left subsystems connected by said head band, each of said subsystems including:

a casing;

a baffle board having a plurality of apertures therein, said casing and said baffle board defining an enclosure;

at least two spaced driver units for reproducing front and rear channel signals secured within said enclosure to the back surface of said baffle board; and sound insulating means attached to the front surface of said baffle board between said driver units and adjacent the ear of a listener wearing said headphones, said sound insulating means being formed of a foam material which transmits low-pitched tones, at least the high range components of the front and rear channel signals reproduced by said driver units being prevented from mixing by said sound insulating material until the sound reaches the auditory canal of said listener's ear.

2. Four-channel headphones according to claim 1, wherein said driver units comprise front and rear channel medium-high range units disposed at the ends of said baffle board, said medium-high range driver unit for the rear channel having inferior high range performance with respect to that of said front medium-high range driver unit; and wherein each of said subsystems further includes a woofer disposed within said enclosure on a central portion of said baffle board between said front and rear driver units.

3. Four-channel headphones according to claim 2, wherein each of said subsystems further includes first control means for varying the high range tone output level of said front medium-high range driver unit.

4. Four-channel headphones according to claim 2, wherein each of said subsystems further includes a changeover switch having a first position wherein said front and rear channel signals are coupled to said driver units for selecting four channel operation and a second position wherein only one of said channel signals is coupled to said driver units for selecting two-channel operation; and second control means coupled to said driver units for receiving one of said channel signals, said second control means operating as a volume balancing control for one of said medium-high range driver units when said changeover switch is in the four-channel position and balancing adjustment is possible between said front and rear driver units, and operating as a volume control connected in parallel with said front and rear channel medium-high range driver units when said changeover switch is in the two-channel position.

5. Four-channel headphones according to claim 4, wherein said changeover switch further couples said channel signals to said woofer and wherein said second control means is coupled to said woofer.

* * * * *